United States Patent Office.

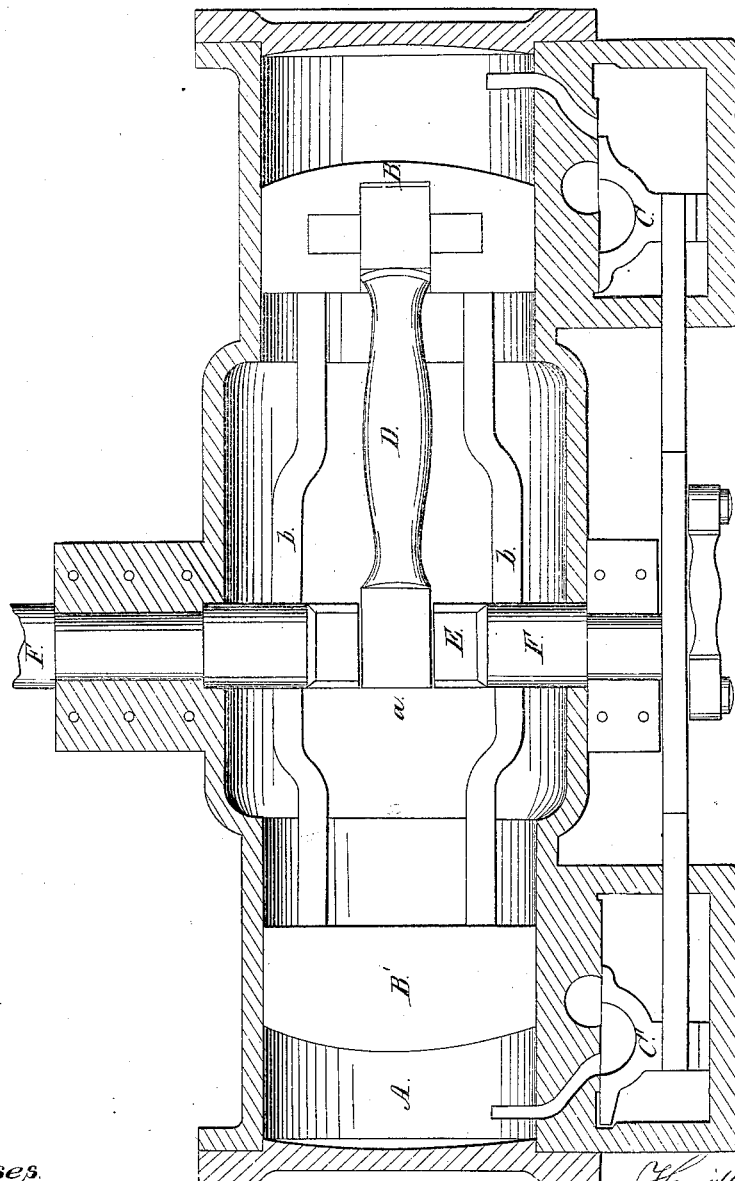

HAMILTON RUDDICK, OF BOSTON, MASSACHUSETTS.

Letters Patent No. 60,943, dated January 1, 1867.

IMPROVEMENT IN STEAM ENGINES.

The Schedule referred to in these Letters Patent and making part of the same.

TO ALL WHOM IT MAY CONCERN:

Be it known that I, HAMILTON RUDDICK, of Boston, in the county of Suffolk, and State of Massachusetts, have invented a new and useful Improvement in Direct-Acting Steam Engines; and I do hereby declare that the following is a full, clear, and exact description of the construction and operation of the same, reference being had to the accompanying drawing, forming a part of this specification.

My improvements consist in a new arrangement of piston, crank, and connecting-rod, with relation to each other and the cylinder, by which I bring the power very near to the work, and dispense with much cumbrous machinery in the shape of cross-heads, slides, piston-rods, stuffing-boxes, and valve-rods.

A is a cylinder, having its centre slightly enlarged, as at $a$, and containing at each end a piston head, B B', connected with each other by rods $b\ b$. Valves C C' admit steam at either end and serve also as exhaust valves if desired. A connecting-rod, D, from piston head B, gives motion to crank E on shaft F, which works the valves by eccentrics or cranks, and carries a belt-pulley or small fly-wheel. It will be seen that this construction is very simple and compact, may be readily put together, is cheap, and requires but little careful labor in construction and fitting of parts, enabling us to dispense with cross-heads and their slides, with all stuffing-boxes, and all carefully finished piston-rods; requiring, in fact, only the cylinder, valve gear, and crank-pin to be finely finished, while in the old form of engine there were many other elaborate sliding parts. The rods $b\ b$ may be made straight, and there may be three or more of them. This engine may also have a variable cut-off, but as it is the intention to run it at great speed, to have a large bore and short stroke to the cylinder, it will, in most cases, be as well to use a constant point of cut off. This high velocity will also render a fly-wheel of less importance, particularly when used to run heavy revolving machinery at high speeds; and it is believed the engine will be very useful in the mining districts from its simplicity of construction and its speed of stroke.

I do not claim the devices of William Mont Storm, patented July 11, A. D. 1865, nor of R. F. Hatfield, July 3, 1866, to which I have been referred by the Patent Office, or either of such devices, but what I claim as my invention, and desire to secure by Letters Patent, is—

The arrangement of piston heads B B', rods $b\ b$, connecting-rod D, and crank E, relatively to each other and the cylinder A, substantially as described.

HAMILTON RUDDICK.

Witnesses:
THOS. WM. CLARKE,
CHAS. F. PARKER.